G. W. WEBER & G. F. MILLER.
SHEET METAL CADDY FOR SPICES AND OTHER ARTICLES.
APPLICATION FILED MAR. 6, 1907.
911,859.
Patented Feb. 9, 1909.
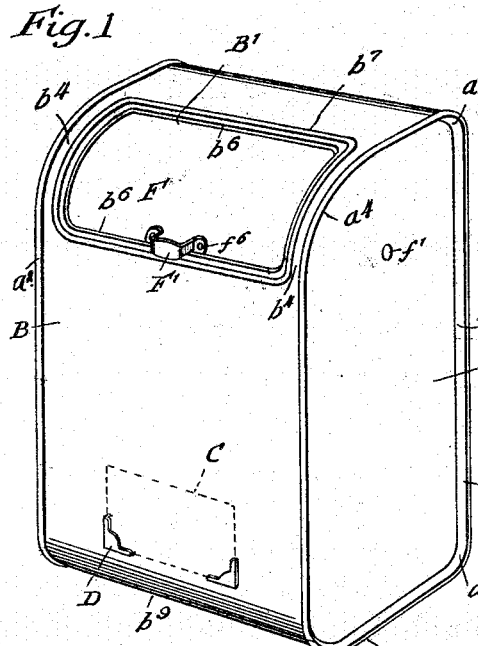
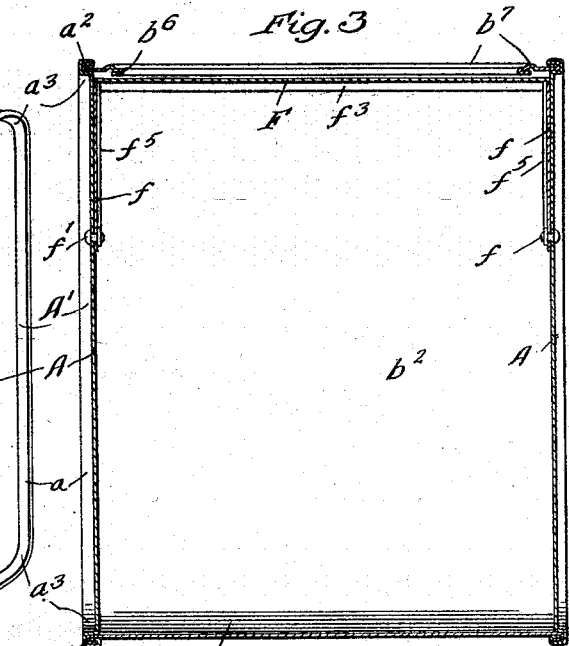
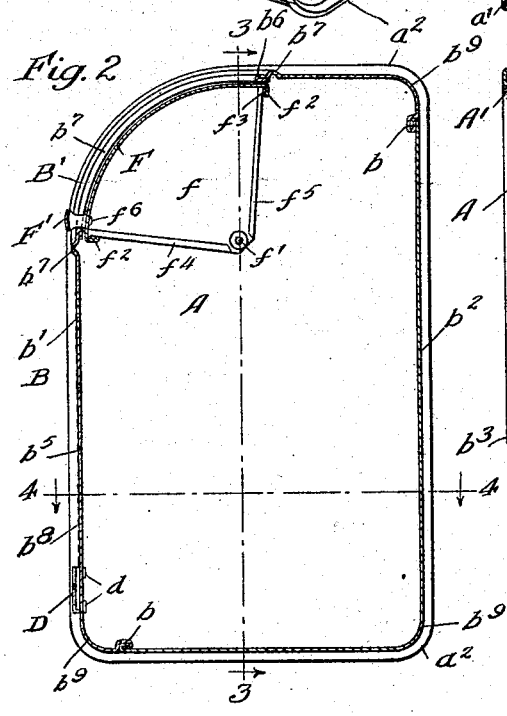
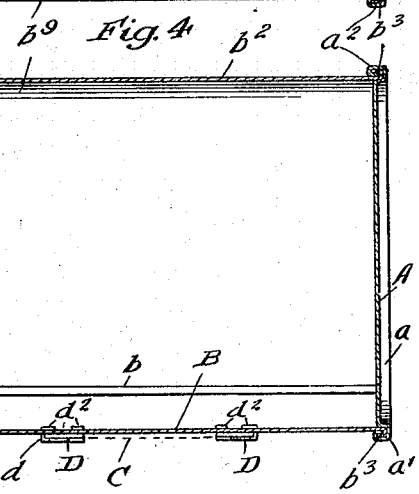
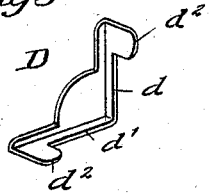
Witnesses:
Inventors
George W. Weber
George F. Miller
By Munday, Evarts, Adcock & Clarke.
Attorneys

UNITED STATES PATENT OFFICE.

GEORGE W. WEBER AND GEORGE F. MILLER, OF NEW YORK, N. Y., ASSIGNORS TO AMERICAN CAN COMPANY, OF NEW YORK, N. Y., A CORPORATION OF NEW JERSEY.

SHEET-METAL CADDY FOR SPICES AND OTHER ARTICLES.

No. 911,859.   Specification of Letters Patent.   Patented Feb. 9, 1909.

Application filed March 6, 1907. Serial No. 360,832.

*To all whom it may concern:*

Be it known that we, GEORGE W. WEBER and GEORGE F. MILLER, citizens of the United States, residing in New York, in the county of New York and State of New York, have invented a new and useful Improvement in Sheet-Metal Caddies for Spices or other Articles, of which the following is a specification.

Our invention relates to improvements in sheet metal caddies for holding and dispensing spices and other articles.

Sheet metal caddies ordinarily have decorated fronts, and as heretofore constructed the body or upright sides, top, and bottom of the caddy have usually been made of separate metallic sheets or plates soldered together at their meeting upright and horizontal edges or the several corners of the caddy, and the curved or inclined top portion surrounding the door opening has usually been built up of a number of different pieces of sheet metal soldered together; so that the manufacture of the caddies has always involved a large amount of tinners or hand work, thus making their manufacture expensive and at the same time producing a structure as a whole, having a pieced-out appearance, and one which is weak and flimsy in construction, and in which the decoration of the top and front is more or less liable to be marred, smeared, or injured by the soldering tools and heat of the soldering operation in soldering the several parts together.

The object of our invention is to provide an improved sheet metal caddy of such construction that it may be rapidly and cheaply manufactured by automatic machinery and without hand labor, and in which the several pieces or parts of the caddy may be properly secured together without solder or the necessity of any soldering operation, and in which the several different pieces or parts of the caddy will coöperate with each other to mutually brace and stiffen each other and give strength, rigidity and durability to the structure as a whole.

The invention consists in the means we employ to practically accomplish this object or result, as herein shown and described and more particularly specified in the claims.

In the accompanying drawings, forming a part of this specification, Figure 1 is a perspective view of a sheet metal caddy embodying our invention. Fig. 2 is a central vertical cross section. Fig. 3 a longitudinal vertical section on line 3—3 of Fig. 2. Fig. 4 is a horizontal section on line 4—4 of Fig. 2, and Fig. 5 is a detail perspective view of one of the sign or label holding clips.

Our improved sheet metal caddy comprises two upright end plates A A, each having a countersink $A^1$ therein surrounded by an outwardly projecting countersink flange $a$, terminating in a seaming flange $a^1$, and a body portion B which may be formed of one or more sheet metal plates, the meeting edges of which are secured together by horizontal folded lock seam or seams $b$. In practice we prefer to form the body B of the caddy of two separate plates, one, which we term the front-and-top plate, $b^1$, and the other the bottom-and-back plate, $b^2$, as the caddies are often too large in size to form the entire body out of one sheet or piece of tin plate, and as ordinarily it is only the front and top portion of the caddy which requires to be furnished with ornamental decoration. The body B of the caddy, whether formed of one or more plates, has at each end a seaming flange $b^3$, which is folded with the seaming flange $a^1$ of the upright end plate A into a double or other seam $a^2$, which seams securely unite the end plates to the body of the caddy and at the same time form at each end thereof, in connection with the countersunk flange $a$, projecting marginal stiffening ribs at the upright and horizontal end corners of the caddy, which serve to greatly brace, stiffen and strengthen the structure as a whole, and also give it a neat appearance and smooth finish at its upright and horizontal end corners.

The upright end plates A A of the caddy are furnished with rounded corners $a^3$ at the two lower corners thereof and at the back upright corner, and with a larger rounded or substantially quadrant shaped corner $a^4$ conforming to the curvature of the cylindrically curved top portion $b^4$ of the caddy; to give additional strength and durability to the caddy at such parts, and to enable the double seams $a^2$ to extend in one continuous seam around the entire margins of the upright end plates A A.

The front portions $b^5$ of the caddy may receive any desired ornamental decoration $b^8$ thereon, and, if desired, the decoration may extend to the top portion $b^4$ of the caddy, as the top $b^4$ and front $b^5$ are both formed in one integral front-and-top plate $b^1$. The caddy top-and-front plate $b^1$ is furnished at the curved portion $b^4$ with a door opening $B^1$ therein, surrounded preferably by a marginal inturned edge fold or flange $b^6$, and by a raised marginal stiffening rib or bead $b^7$.

C is the label or sign removably secured on the front portion $b^5$ of the caddy, preferably by sheet metal sign or label holders D D, each having upright and horizontal flanges $d$ $d^1$ furnished with clenching lips or tongues $d^2$ which are inserted through slots formed in the body of the caddy at the front portion thereof. The body of the caddy has rounded horizontal corners $b^9$ corresponding to the rounded corners of the upright end plates at the two lower horizontal corners and at the back upper horizontal corner, and a large curved portion $b^4$ at the upper front corner portion of the caddy.

F is the swinging or roll top door of the caddy, which closes the door opening $B^1$ in the cylindrically curved front corner portion of the caddy top-and-front plate $b^1$. The sheet metal door F has end plates $f f$ pivotally secured by rivets $f^1$ to the upright end plates A A of the caddy. The swinging or roll top door F is furnished at its upper and lower horizontal edges with right angle flanges $f^2$, having inturned folds or flanges $f^3$ to strengthen and stiffen the same and give it a smooth finish. And the end plates or portions $f f$ of the door are also provided at their horizontal and upright edges with folds $f^4$ $f^5$ to further strengthen and stiffen the door.

The door F is preferably furnished with a handle or thumb piece $F^1$, which may be preferably secured to the door by rivets $f^6$ at or near its lower edge. This handle or thumb piece also serves as a stop to limit the upward and downward turning or swinging movements of the door by engagement with the top-and-front plate at the upper and lower edges of the door opening therein.

By this means we produce not only a very neat, strong and durable sheet metal caddy, but one which may be manufactured very cheaply and rapidly by automatic machinery, and without the use of solder, and one which is made up of few parts or pieces.

We claim:

1. A sheet metal caddy comprising a pair of upright end plates having quadrant shaped upper front corners, a body seamed at its ends to said end plates and having at its front and top a cylindrically curved quadrant shaped one piece portion provided with a door opening formed wholly in said curved one piece portion, and a quadrant shaped swinging door having end portions pivotally secured to said upright end plates, substantially as specified.

2. In a sheet metal caddy the combination with countersunk upright end plates having marginal seaming flanges and rounded upper front corners, of a caddy body seamed at its ends to said upright end plates and composed of an integral front and top plate having a rounded upper front corner, and provided with a door opening formed wholly within said integral plate, and a quadrant shaped swinging door having end portions pivotally connected to said upright end plates, substantially as specified.

3. A sheet metal caddy comprising upright countersunk end plates having rounded corners and marginal seaming flanges, a body having at its lateral ends seaming flanges interfolded with the seaming flanges of the end plates, said body having a one piece front and top portion united by an integral cylindrically curved portion at the upper front corner, said cylindrically curved portion being furnished with a door opening formed wholly therein and surrounded by a marginal fold, and a quadrant shaped cylindrically curved swinging door having end portions pivoted to said upright end plates, substantially as specified.

GEORGE W. WEBER.
GEORGE F. MILLER.

Witnesses:
LEMUEL A. WELLES,
G. L. BROWN.